(12) United States Patent
Durr

(10) Patent No.: US 6,460,841 B1
(45) Date of Patent: Oct. 8, 2002

(54) MODULAR CUTTING BOARD

(76) Inventor: Bruce A. Durr, 130 Hunters Dr., Cumming, GA (US) 30040

( * ) Notice: Subject to any disclaimer, the term of this patent is extended or adjusted under 35 U.S.C. 154(b) by 0 days.

(21) Appl. No.: 09/982,807

(22) Filed: Oct. 22, 2001

(51) Int. Cl.[7] .................................................. B23Q 3/00
(52) U.S. Cl. .................. 269/289 R; 269/302.1
(58) Field of Search .................. 269/289 R, 302.1, 269/13, 315, 303

(56) References Cited

U.S. PATENT DOCUMENTS

| | | | |
|---|---|---|---|
| 2,778,324 A | | 1/1957 | Mattson |
| 4,017,063 A | * | 4/1977 | Brusich .................. 269/302.1 |
| 4,204,451 A | * | 5/1980 | Reichert .................. 269/302.1 |
| 4,756,519 A | | 7/1988 | Lilja |
| 4,907,789 A | * | 3/1990 | Tice .............................. 269/13 |
| 5,033,346 A | * | 7/1991 | Kozyrski ..................... 83/464 |
| 5,100,115 A | * | 3/1992 | Schorn ..................... 269/302.1 |
| 5,386,978 A | | 2/1995 | Ladwig |
| 5,501,441 A | * | 3/1996 | Kegley .................. 269/289 R |
| 5,527,022 A | | 6/1996 | Gibson |

* cited by examiner

Primary Examiner—M. Rachuba
Assistant Examiner—Daniel Shanley
(74) Attorney, Agent, or Firm—Siemens Patent Services, LC

(57) ABSTRACT

A modular cutting/pastry board having a plurality of joinable board sections is disclosed. Each board section, typically of a food grade plastic material, has a keyed tongue disposed along a first edge and a keyhole groove disposed along a second edge such that when engaged, a single, rigid board is formed. Removable handles using the same keyed tongue and keyhole groove provide ease in moving the cutting/pastry board. The board segments can be used individually for smaller cutting/pastry tasks or joined for larger tasks. Disassembled, the board is compact for easy storage or dishwasher cleansing.

9 Claims, 3 Drawing Sheets

MODULAR CUTTING BOARD

BACKGROUND OF THE INVENTION

1. Field of the Invention

The present invention relates to cutting and pastry boards. More particularly, the invention comprises an expandable, modular cutting/pastry board.

2. Description of the Prior Art

Cutting boards, ranging from butcher block tables to light weight surface protective pads, have been used for many years. One drawback to most cutting boards is that in order to be of sufficient size for most cutting jobs they become too large for convenient cleaning and storage. A second drawback is that not all jobs require the same size cutting board. For example, most cooks use a small board for slicing vegetables but need a sizable board for carving meats, such as turkeys, requiring additional storage space for a number of different boards.

U.S. Pat. No. 5,527,022, issued to Jeremy H. Gibson on Jun. 18, 1996, presents a CUTTING BOARD, which is a single piece having a substantially flat upper surface with a slight crown to allow juices to flow into juice channels running along a first end and two sides. Raised "teeth" in the surface grip the item being cut and a shovel chute at a second end allows guiding of cut items from the board.

U.S. Pat. No. 5,501,441, issued to Bill A. Kegley on Mar. 26, 1996, presents a CUTTING BOARD IMPROVEMENT, a one piece board of a flexible material having hand holes on two, diagonally opposite corners which allow folding of the board to funnel cut items to a smaller receptacle.

U.S. Pat. No. 5,386,978, issued to Todd O. Ladwig on Feb. 7, 1995, presents a CUTTING BOARD, a single piece board having a living hinge between two adjoining, rectangular sections allowing the board to be folded to allow cut objects to be funneled from the board into a smaller receptacle.

While Gibson, Kegley and Ladwig each present single piece boards of fixed size, the present invention provides a board whose size may be adjusted by adding or deleting sections of board, as required. Furthermore, while Gibson and Ladwig each include a handle on one end of the board, the present invention provides for removable handles on each of the two ends for easier carrying. While Kegley includes a pair of handles, his board does not have rigidity for carrying, as does the cutting board of the present invention.

U.S. Pat. No. 4,756,519, issued to Curt L. Lilja on Jul. 12, 1988, presents an ARRANGEMENT IN CUTTING BOARDS, which provides a system whereby a plurality of boards may be joined by dovetail or similar type mortis and tenon joints to produce a cutting surface of variable size. Various ancillary devices, such as cutting guides may also be fitted to the board by way of the mortises or tenons. The board arrangement of Lilja, while including the possibility of hand grips, does not have the interlocking joints of the present invention which allow the expanded board to be carried from place to place, as it would become disassembled, if lifted.

U.S. Pat. No. 2,778,324, issued to Edith M. Mattson on Jan. 22, 1957, presents a COLLAPSIBLE PASTRY BOARD. A pair of board sections, one having a mortise and the other having a tenon are covered and connected by a flexible cloth cover. The mortise and tenon prevent lateral slippage between the two board sections while allowing folding of the entire unit along the hinge formed by the cloth cover. As a cloth covered pastry board, Mattson does not provide a solid cutting surface provided by the present invention, and unlike the present invention is not easily transportable in the expanded mode if loaded, nor is there provision for expanding the board beyond the two sections provided.

None of the above inventions and patents, taken either singly or in combination, is seen to describe the instant invention as claimed.

SUMMARY OF THE INVENTION

The present invention provides a expandable cutting/pastry board composed of a plurality of interconnecting sections. While a cook preparing vegetables for the pot may only require a small board, one carving a turkey, cutting other large items or preparing pastries may require a board of considerable size. The novel cutting/pastry board of the invention allows a kitchen to be equipped with a number of interlocking board sections of a modest size rather than a variety of different sized boards, thereby simplifying storage and washing.

Accordingly, it is a principal object of the invention to provide a modular cutting/pastry board which may be assembled and disassembled to varying sizes, depending on the requirements of the individual task.

It is another object of the invention to provide a modular cutting/pastry board which may be easily disassembled to fit compactly into a dishwasher or cabinet.

It is a further object of the invention to provide a modular cutting/pastry board which has a durable cutting surface.

Still another object of the invention is to provide a modular cutting/pastry board which has a surface resistant to harboring germs and bacteria.

Yet another object of the invention is to provide a modular cutting/pastry board with a relatively non-stick surface.

An additional object of the invention is to provide a modular cutting/pastry board with an easily cleaned surface.

It is again an object of the invention to provide a modular cutting/pastry board which has rigidity, regardless of the number of sections assembled, for moving from place to place, even when loaded.

Yet another object of the invention is to provide a modular cutting/pastry board with handles which may be easily installed for ease of moving the board from place to place.

Still another object of the invention is to provide a modular cutting/pastry board which contains a trough for collecting juice runoff separate from the cutting surface.

Another object of the invention is to provide a modular cutting/pastry board with leak-proof joints.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
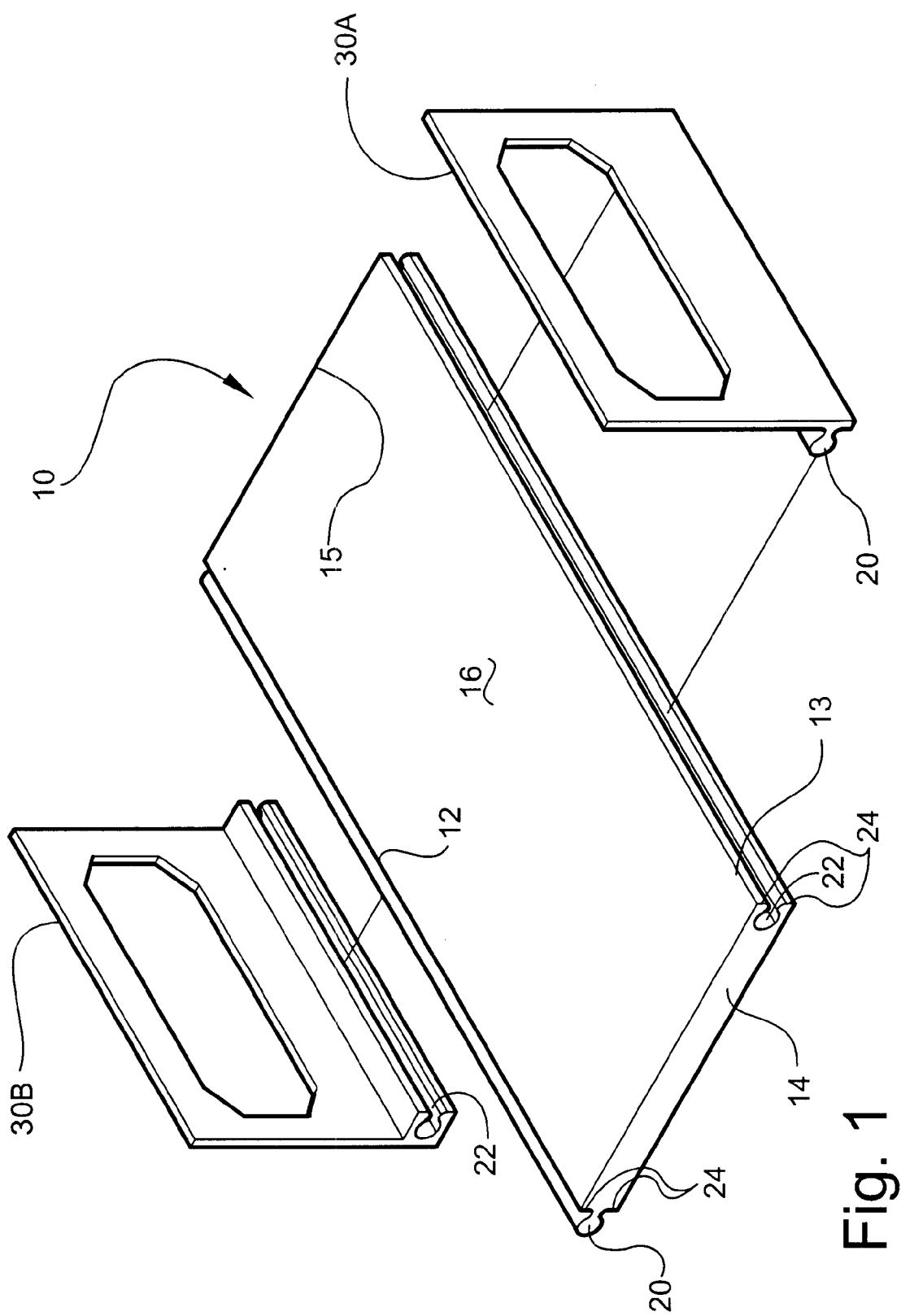
FIG. 1 is a perspective view of a single board segment and handles of the inventive cutting/pastry board.
Figure 2:
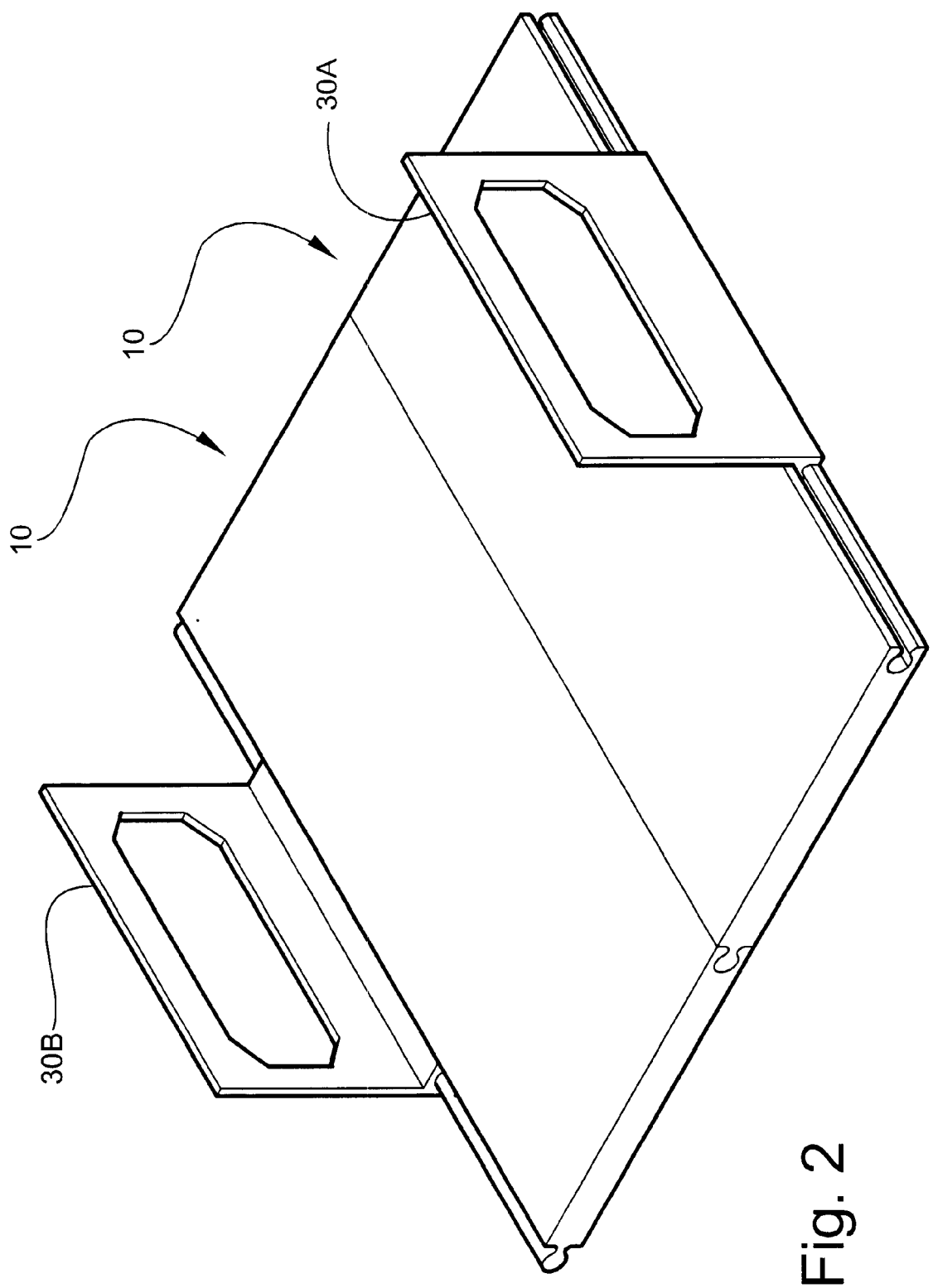
FIG. 2 is a perspective view of the assembled cutting/pastry board.

As depicted in FIGS. 1 and 2, the present cutting/pastry board 1 is composed of two basic elements, board segment 10 and handle 30, both typically made from a food grade plastic such as, but not limited to, Delrin®. (Generic; polymer from formaldehyde) Use of an Ultra High Density Weight (UHMW) or High Density Polyethylene (HDPE) plastic, however, would introduce the decorative potential of color, in addition to strength and durability. Such materials provide a surface which are resistant to cutting, relatively non-stick, and dishwasher safe. Durable hardwoods, such as, but not limited to, teak, maple or oak could also be used for more decorative, although less durable, boards.

Board segment 10 is a substantially rectangular sheet having a first length edge 12, a second length edge 13, a first width edges 14, a second width edge 15, an upper surface 16, a lower surface 18, and a pre-determined, uniform thickness between upper surface 16 and lower surface 18. For purposes of disclosure, a typical board may have a length of approximately 8 inches, a width of approximately 16 inches, and a thickness of approximately one half to three quarters of an inch. It would be evident to one skilled in the art that both surface dimensions and thickness could be varied as required to meet differing usage requirements.

First length edge 12 of board segment 10 is formed such that a keyed tongue 20, extends along the entire length and is typically centered upon the thickness thereof. Keyed tongue 20 has an end profile resembling a narrow neck extending from a first end at first length edge 12 and having a rounded head at a second end. Shoulders 24 are formed by first length edge 12 on each of the two sides of the neck of keyed tongue 20. Second length edge 13 of board segment 10 is formed such that a keyhole groove 22 extends the entire length and is centered upon the thickness thereof. Keyhole groove 22 is shaped and dimensioned to slidably, but snugly, engage keyed tongue 20 from either of its open ends. Both keyed tongue 20 and keyhole groove 22 have sufficient shoulder 24 to maintain rigidity of a plurality of joined board segments 10. In addition to providing the required rigidity, the shape of keyed tongue 20 and keyhole groove 22 also forms a leak proof joint, preventing juices from cut objects from seeping between board segments 10 to the surface below, as well as eliminating the potential for growth of bacteria in sharp angles, which are harder to clean.

It would be evident to one skilled in the art that while a rounded shape has been presented for disclosure, keyed tongue 20 and keyhole groove 22 could be of other configurations, including, but not necessarily limited to, a dovetail design, although, as pointed out above, joints having sharp angles are more susceptible to bacterial growth.

Handles 30A, 30B could be of any cosmetic design allowing an easy grasp of cutting/pastry board 1, with keyed tongue 20 and keyhole groove 22. As illustrated in FIG. 1, handle 30A bears a keyed tongue 20 proximate its lower edge while handle 30B bears a keyhole groove 22 proximate its lower edge, each adapted to engage the keyhole grove 22 and keyed tongue 20 of a board segment 10, respectively. It would be evident to one skilled in the art that in the interest of economy of manufacture, a pair of identical handles 30, each having a keyed tongue 20 on adjacent a first edge and a keyhole groove on adjacent a second edge, would be equally effective.

Figure 3:
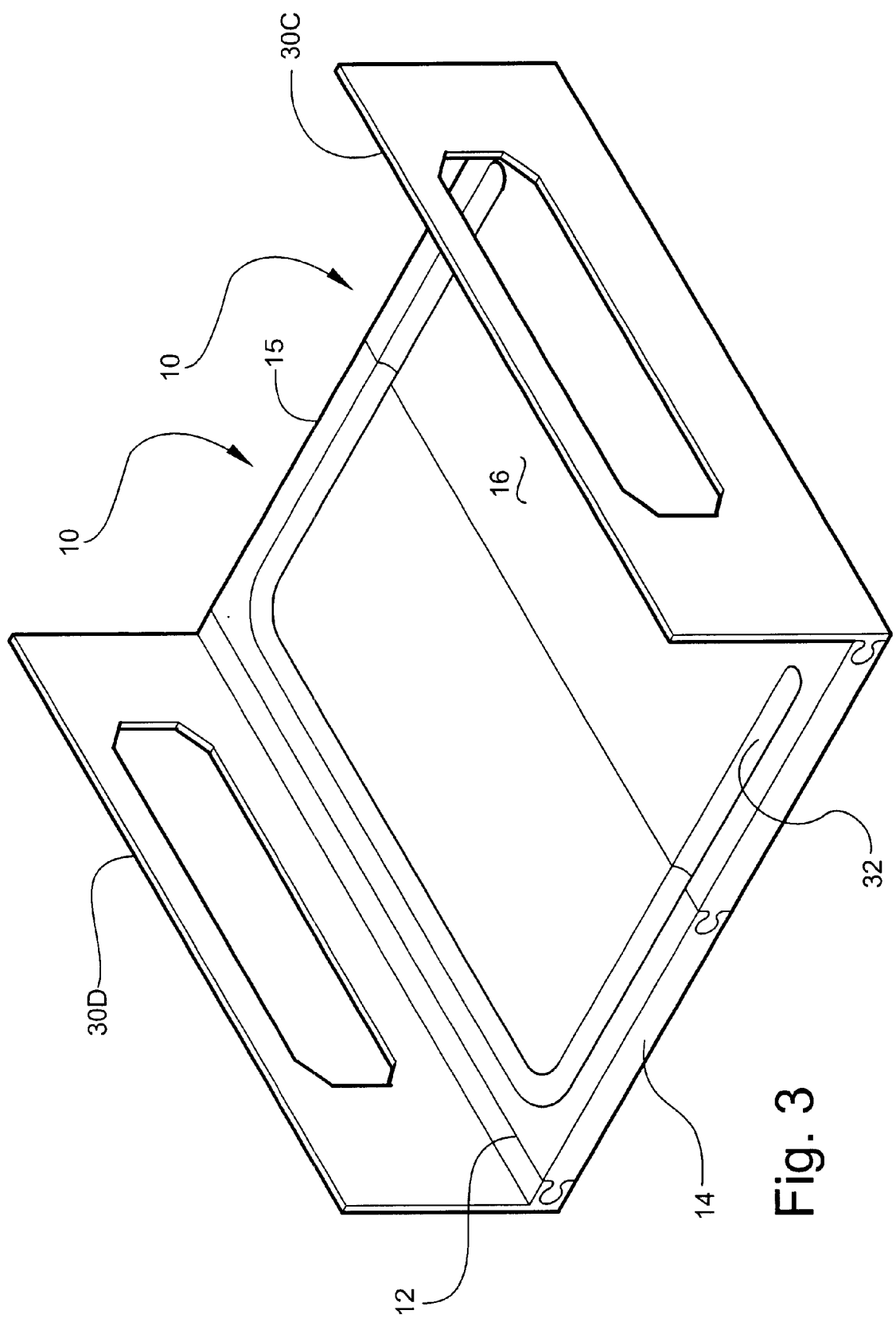
FIG. 3 is a perspective view of the inventive cutting/pastry board showing features of various optional embodiments.

Referring now to FIG. 3, in alternative embodiments, selected board segments 10 could be grooved proximate width edges 14, 15 and other selected board segments 10 further being grooved proximate length edge 12 or 13 such that a juice trough 32 is formed to drain meat juices and the like from the surface of board segments 10. It would be evident to one skilled in the art that upper surface 16 could be crowned to direct juices into juice trough 32. Additionally, handles 30C, presenting a solid base along their juncture with board segments 10, could be extended to a length approximately equal to that of board segments 10, thereby providing a means for funneling cut objects from cutting/pastry board 1 into a smaller container.

It is to be understood that the present invention is not limited to the embodiments described above, but encompasses any and all embodiments within the scope of the following claims.

What is claimed is:

1. A modular cutting/pastry board comprising:
   at least one substantially rectangular, substantially planar board segment having four edges and a predetermined thickness, each of said at least one board segment having
      a first joining means disposed on at least a first one of said edges and
      a second joining means disposed on at least an opposing one of said edges,
   one of said board segments being adapted to engage another one of said board segments,
      said first joining means of one of said board segments being configured to retentively engage said second joining means of another one of said board segments,
   whereby when said first joining means of said one of said board segment engages said second joining means of said other board segment, a rigid adjacent connection is formed therebetween, and
   a pair of handles adapted for removable attachment to said cutting/pastry board utilizing at least one of said first and said second joining means.

2. A modular cutting/pastry board, as defined in claim 1, wherein said board segments comprise a food grade plastic.

3. A modular cutting/pastry board, as defined in claim 2, wherein said food grade plastic is one from the group:
   a UHMW plastic,
   a HDPE plastic, and
   an Acetal plastic.

4. A modular cutting/pastry board, as defined in claim 1, wherein
   said first joining means comprises a keyed tongue extending along a first length edge of said board segment, and
   said second joining means comprises keyhole groove extending along a second length edge of said board segment,
   said keyed tongue of one of said board segments adapted for engaging said keyhole groove of an adjacent one of said board segments.

5. A modular cutting/pastry board, as defined in claim, 1 wherein said handles are disposed substantially normal to said cutting/pastry board, and
   a first one of said handles further comprises a keyed tongue proximate the lower edge thereof adapted for engagement of said keyhole groove of one of said board segments, and a second one of said handles further comprises a keyhole groove proximate the lower edge thereof adapted for receiving said keyed tongue of one of said board segments.

6. A modular cutting/pastry board, as defined in claim 5, wherein each of said handles comprises:

a keyed tongue along a first side proximate the lower edge thereof, and a keyhole groove along a second side proximate the lower edge thereof, said keyed tongue adapted for engaging said keyhole groove of one of said board segments, and said keyhole groove adapted for engaging said keyed tongue of one of said board segments.

7. A modular cutting/pastry board, as defined in claim 5, wherein at least one of said handles is substantially equal in length to at least one of said board segment and adapted to form, in conjunction with the cutting surface of said cutting/pastry board, a trough adapted to guide cut objects into a smaller receptacle.

8. A modular cutting/pastry board, as defined in claim 1, wherein said board segment further comprises a groove proximate at least one of said edges thereof adapted to contain juices released from cut objects.

9. A modular cutting/pastry board comprising:

at least one substantially rectangular, substantially planar board segment having four edges and a predetermined thickness, said board segments comprising a food grade plastic, and having a first joining means disposed on at least a first one of said edges, said first joining means comprising a keyed tongue extending along a first of said edges of said board segment, and a second joining means disposed on at least an opposing one of said edges, said second joining means comprising a keyhole groove extending along a second of said edges of said board segments, said keyed tongue of one of said board segments adapted for engaging said keyhole groove of another of said board segments;

a pair of handles adapted for removable attachment to said cutting/pastry board utilizing at least one of said first and said second joining means, said handles being substantially normal to said cutting/pastry board, and a first of said handles further comprising a keyed tongue proximate the lower edge thereof adapted for engagement of said keyhole groove on one of said board segments, and a second of said handles further comprising a keyhole groove proximate the lower edge thereof adapted for receiving said keyed tongue of one of said board segments.

\* \* \* \* \*